United States Patent [19]
Izard et al.

[11] Patent Number: 5,387,768
[45] Date of Patent: Feb. 7, 1995

[54] ELEVATOR PASSENGER DETECTOR AND DOOR CONTROL SYSTEM WHICH MASKS PORTIONS OF A HALL IMAGE TO DETERMINE MOTION AND COURT PASSENGERS

[75] Inventors: Jeff Izard, Bolton; Francois M. Mottier, West Hartford, both of Conn.

[73] Assignee: Otis Elevator Company, Farmington, Conn.

[21] Appl. No.: 127,563

[22] Filed: Sep. 27, 1993

[51] Int. Cl.⁶ .......................... B66B 3/04; H04N 7/18
[52] U.S. Cl. ..................................... 187/392; 348/156
[58] Field of Search ............... 187/132, 103, 104, 130, 187/100; 49/120, 118; 358/105, 108; 382/22

[56] References Cited

U.S. PATENT DOCUMENTS

| | | | |
|---|---|---|---|
| Re. 25,665 | 10/1964 | Nikazy | 187/103 |
| Re. 33,668 | 8/1991 | Gray | 250/221 |
| 3,534,499 | 1/1970 | Chaffee | 49/25 |
| 3,691,556 | 9/1972 | Bloice et al. | 343/5 |
| 3,796,208 | 3/1974 | Bloice | 128/2 |
| 4,044,860 | 8/1977 | Kaneko et al. | 187/29 |
| 4,506,765 | 3/1985 | Payne et al. | 187/29 |
| 4,662,479 | 5/1987 | Tsuji et al. | 187/131 |
| 4,799,243 | 1/1989 | Zepke | 377/6 |
| 4,823,010 | 4/1989 | Kornbrekke et al. | 250/341 |
| 4,858,156 | 8/1989 | Martin | 364/560 |
| 4,874,063 | 10/1989 | Taylor | 187/130 |
| 4,924,416 | 5/1990 | Sasao | 364/550 |
| 4,967,083 | 10/1990 | Kornbrekke et al. | 250/341 |
| 5,001,557 | 3/1991 | Begle | 358/113 |
| 5,075,632 | 12/1991 | Payne et al. | 328/5 |
| 5,142,152 | 8/1992 | Boiucaner | 250/341 |
| 5,149,921 | 9/1992 | Picado | 187/130 |
| 5,182,778 | 1/1993 | Suzuki et al. | 382/14 |
| 5,258,586 | 11/1993 | Suzuki et al. | 187/124 |
| 5,298,697 | 3/1994 | Suzuki et al. | 187/131 |

FOREIGN PATENT DOCUMENTS

| | | | |
|---|---|---|---|
| 534714-A2 | 3/1993 | European Pat. Off. | 187/103 |
| 4-213587 | 8/1992 | Japan | 187/132 |

Primary Examiner—Kristine L. Peckman
Assistant Examiner—Robert Nappi

[57] ABSTRACT

Passengers approaching an elevator are distinguished from other people standing in front of an elevator door by obtaining an image signal of an area in front of the elevator door and masking out of the image signal increasing with time greater portions thereof when no motion is indicated by the image signal for controlling door movement when motion is detected in an unmasked portion of the image.

13 Claims, 13 Drawing Sheets

Generation of 5 points for a hall mask.

Inputs:  Camera Location
          Door Edge Positions
          Corners of field of view: HFLC, HFRC, HNLC, HNRC
1) Point 1 = camera C(x,y).
2) Compute slope S1 from camera C(x,y) to corner of edge of right door RD(x,y).
3) Compute intersection I1(x,y) of line with slope S1 from camera C(x,y) to line x = RC.
4) Compute slope S2 from camera C(x,y) to corner of edge of left door LD(x,y).
5) Compute intersection I2(x,y) of line with slope S2 from camera C(x,y) to line x = LR.
6) If y component of intersection I1<y component of RC(x,y), intersection is on right side of field of view,
   Point 2 = I1(x,y),
   Point 3 = RC(x,y).
   Else,
   Compute intersection I3(x,y) of line with slope S1 from camera C(x,y) to line y = RC(y),
   Point 2 = I3(x,y),
   Point 3 = I3(x,y).
7) If y component of intersection I2<y component of LC(x,y) intersection is on left side of field of view,
   Point 5 = I2(x,y),
   Point 4 = LC(x,y).
   Else,
   Compute intersection I4(x,y) of line with slope S2 from camera (x,y) to line y = LC(y),
   Point 4 = I4(x,y),
   Point 5 = I4(x,y).

FIG. 10

Generation of points for a rectangular description of the sill overlay mask.

Inputs:  Door Edge Locations - RD,LD
         Corners of full sill view SFL, SNR 1) Point 1 = x of RD, y of SNRC
2) Point 2 = x of RD, y of SFL
3) Point 3 = x of LD, y of SFL
4) Point 4 = x of LD, y of SNRC

FIG. 11

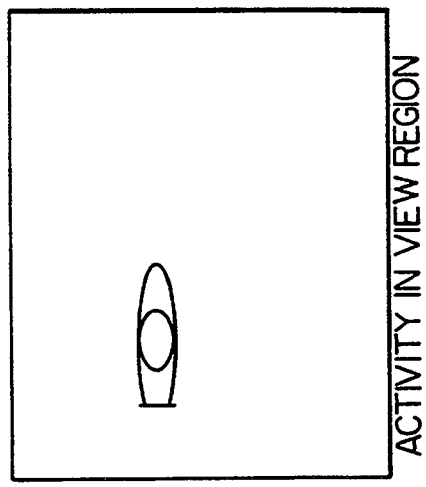
FIG. 12C ACTIVITY IN VIEW REGION
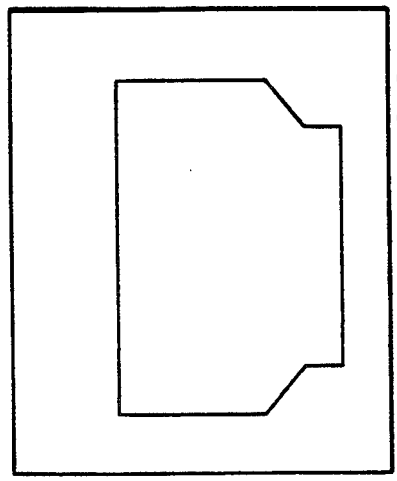
FIG. 12B LOBBY & SILL MASKS SUPERIMPOSED
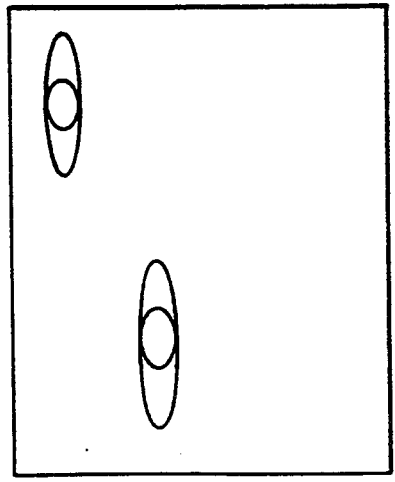
FIG. 12A DIFFERENCE FRAME

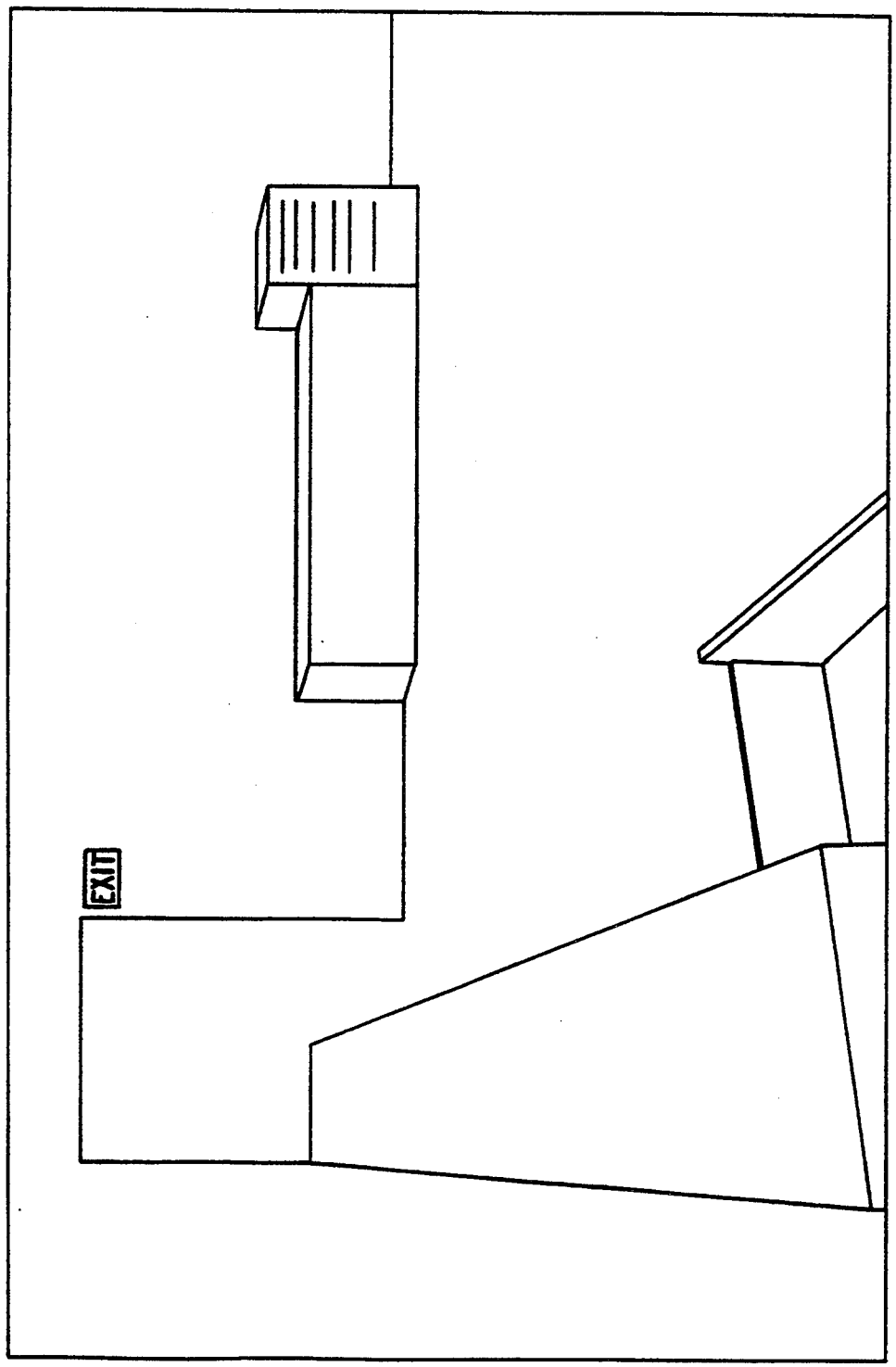

ELEVATOR PASSENGER DETECTOR AND DOOR CONTROL SYSTEM WHICH MASKS PORTIONS OF A HALL IMAGE TO DETERMINE MOTION AND COURT PASSENGERS

TECHNICAL FIELD

The present invention is related to elevator passenger detection.

BACKGROUND OF THE INVENTION

The level of performance of an elevator system is a function of a number of parameters. Among these parameters is the extent to which passengers and prospective passengers of the elevator system are happy with the service they receive from the elevators. This, in turn, is a function of a number of parameters, many of them relating to the amount of time that the passenger spends waiting to be delivered to his destination. This time spent waiting is, in turn, a function of a number of time-based parameters. One of these time-based parameters is the waiting time, that is, the amount of time from when a hall call button is pushed to when the elevator arrives. Another time-based parameter is the ride time between when the elevator car leaves the floor or a hall call button is pushed to the time when the car arrives at the destination floor of the passenger. Between a) the time that the elevator car arrives at the floor to receive the passenger who has pressed a hall call button and b) the time when the elevator car leaves is c) time spent opening elevator doors, holding the doors open so that the passenger can enter and closing the doors. The time spent holding the elevator doors open so that the passenger can enter is called the door dwell time. The door dwell time is typically a fixed quantity which is large to accommodate the great length of time required for a slow-moving passenger or a group of passengers to enter the car. Where a fast-moving passenger quickly enters the car from the hall, that passenger as well as all the passengers already in the car is forced to wait for the elevator door dwell time associated with a slow moving passenger to expire. Thus, this fast-moving passenger has an unnecessarily long waiting time because the door dwell time is fixed to a value suitable to some other slow moving passenger.

In addition, the amount of time that the passenger spends waiting to be delivered to his destination is a function of the efficiency of the elevator dispatching system which is in turn a function of the amount of passenger traffic known to the dispatching system.

DISCLOSURE OF THE INVENTION

Objects of the present invention include elevator passenger detection, door control in response to passenger detection, and a count of the number of elevator passengers.

According to the present invention, by motion detection, using an image signal of an area in front of an elevator door, and masking out of the image signal increasingly with time greater portions of the image signal when no motion is detected. In further accord with the present invention, elevator door control is varied in response to elevator passenger detection. In further accord with the present invention, the elevator passengers are counted.

A first advantage is that the elevator door dwell time is variable. A second advantage is that the average waiting time for passengers in an elevator system decreases because the car is not parked at a floor with doors open to receive passengers that are merely standing in front of the elevator doors without making movements toward the elevator. A further advantage is that the doors are not kept open for a fixed time associated with the time for a slow-moving passenger to enter the elevator. A fourth advantage is that passengers moving near the elevator may be distinguished from those who are not.

A feature of the invention is an image-based motion detection system capable of distinguishing between approaching passengers and closing doors yields the advantage that, in response to approaching passengers, closing elevator doors are commanded to reverse so that an approaching passenger can enter the elevator. Moreover, this feature leads to the further advantage that reversal of the elevator doors is not falsely triggered in response to door movement rather than passenger movement.

BRIEF DESCRIPTION OF THE DRAWINGS

FIG. 10 is a flow chart for creation of the hall mask.

FIG. 11 is a flow chart for creation of the sill mask.

FIG. 12 shows the process of summing the hall and sill masks with the difference image (including a sill difference image and a hall difference image).

FIG. 13 shows a video image for an empty hall.

BEST MODE FOR CARRYING OUT THE INVENTION

Figure 1:
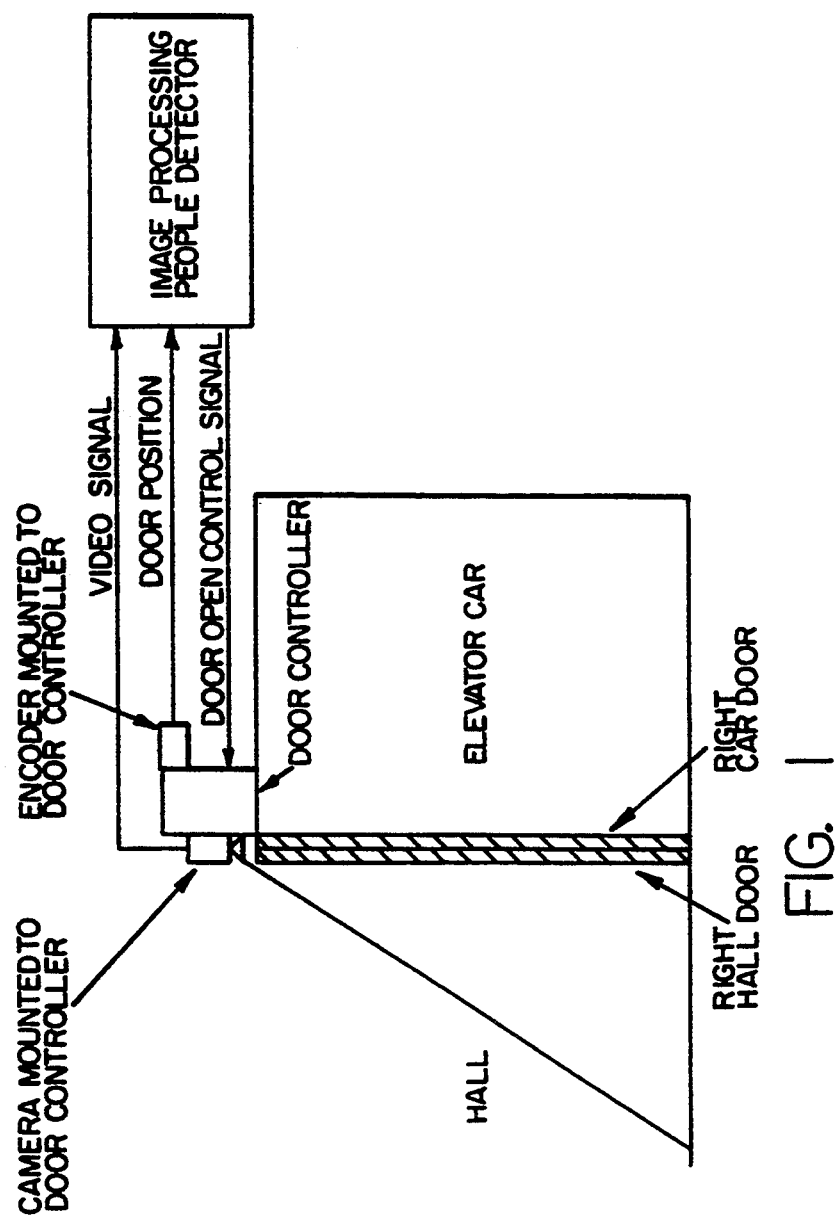
FIG. 1 is a partial block diagram illustrating the hardware used in the present invention and its positional relationship to an elevator door. The unmasked area is shaded.

FIG. 1 shows a video camera mounted to a door controller which is itself mounted on an elevator car. The video camera is directed so that it receives a picture from the hall between two elevator doors. Only a right door, car, and hall, are shown. An image processing people detector receives a video signal from the video camera and a door position signal from an encoder mounted to a motor shaft of an door controller. This allows for detecting a person in the viewing area and providing a control signal to the door controller for commanding closing and opening of the elevator doors in response to detection of a person. The image processing people detector includes an image processing board exemplified by the one available from Androx of Canton, Mass.—the Androx ICS 400 image processing board with Androx ADSP-2100 software.

In addition, the number of people viewed may be counted.

Figure 2:
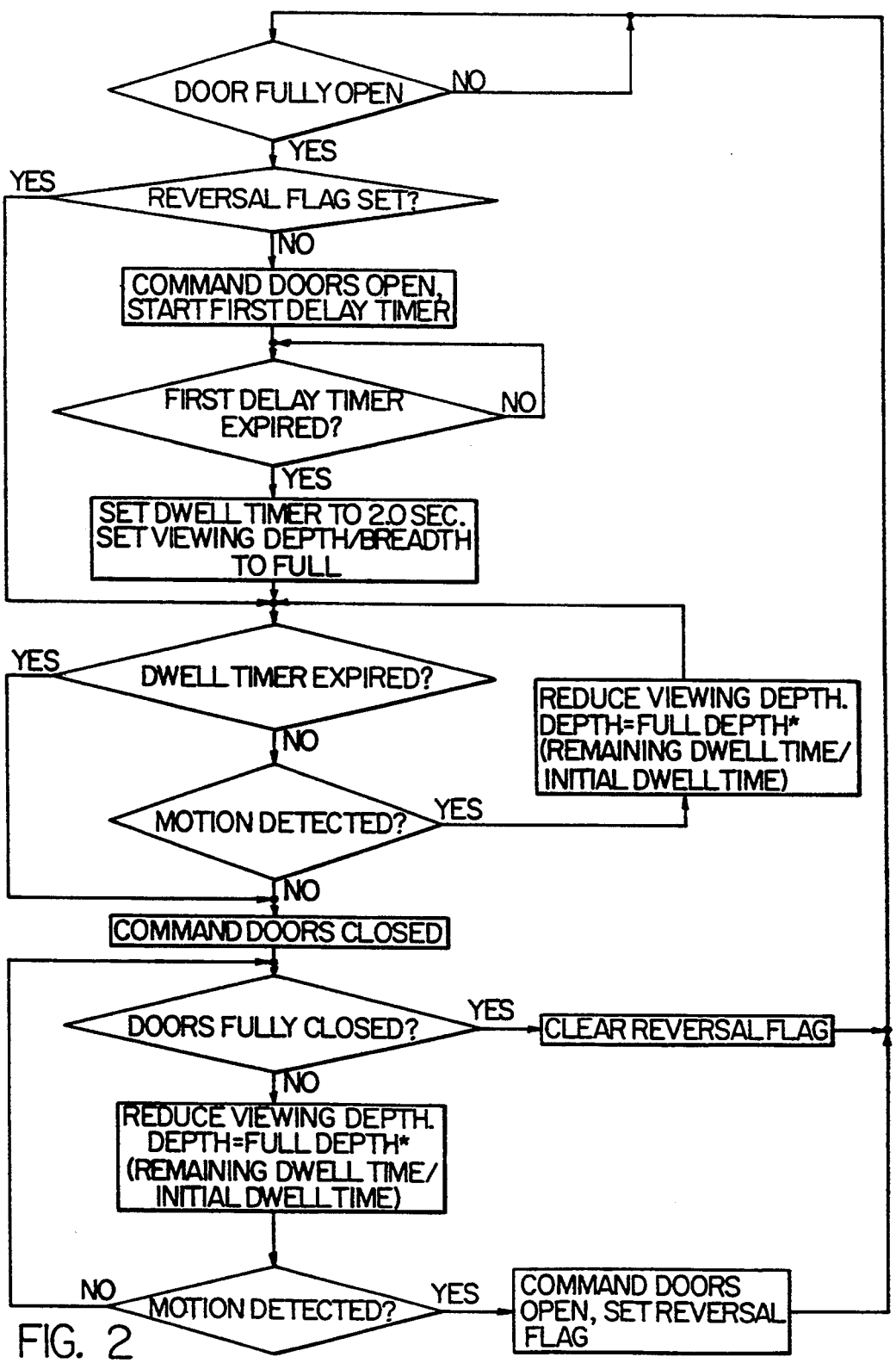
FIG. 2 is a flow chart for control in response to detection of motion.

FIG. 2 is a flow chart for door control. It is the main software routine. The method represented by the flow chart is triggered when the elevator car stops at a landing. Timing of the door control in response to detected motion within the viewing area depends on a condition: whether the doors are fully open because they were reversed to the fully open position. Control of the doors in response to detected motion is delayed a first delay time if the doors have been commanded fully open in normal operation and not in response to a reversal. If no reversal has occurred, the doors are commanded to stay open until the first delay time has expired. In addition, a door dwell timer is set to 2 seconds and the view depth/breadth is set to a maximum. The depth/breadth of view is altered by changing the boundaries of a hall mask for excluding portions of the image provided by the camera from image processing for the purposes of motion detection. This is explained with regard to FIGS. 5-12. The result is that motion detection is limited to images provided within unmasked areas.

If the doors are fully open as a result of a reversal, or following the above steps, then if motion is detected, the depth of the area viewed by the camera is reduced. This sequence is repeated until no motion is detected or the door dwell time expires.

If no motion is detected in the unmasked hall or sill areas, the doors are commanded to close as apparently there is nobody moving near the elevator.

If the door dwell time expires and motion is detected within the sill region, then the doors are commanded to stay open as apparently someone is moving between the doors.

Alternate to varying the view depth, the view breadth may be altered.

If the doors are fully closed, the reversal flag is cleared. If the doors have been commanded to close and are not fully closed and motion is detected, the doors are commanded open and the reversal flag set. If the doors are not fully closed and the door dwell time has not expired, the view depth/breadth is reduced. Detection of motion in the unmasked area causes the doors to open and the reversal flag to be set. If the doors are not fully closed and no motion is detected clearing the reversal flag awaits the door dwell fully closed condition. The main routine is not again executed until the doors again become fully open.

Motion detection includes reception of a video image by the camera (FIG. 1) and masking out portions of the received image with the hall and sill masks so that only motion in a portion of the viewing area near the elevator is considered for varying door dwell time and arriving at a people count within the unmasked area.

FIGS. 3, 4, 5, 6, 7, 8 illustrate the hall and sill masks. Two masks are required: a hall mask and a sill mask. Generation of the hall mask includes generating five points for forming a pentagon. Generation of the sill mask includes generating four points for forming a rectangle. Both may be done using a graphics software package like the one available from Androx associated with the Androx image processing board.

Figure 3:
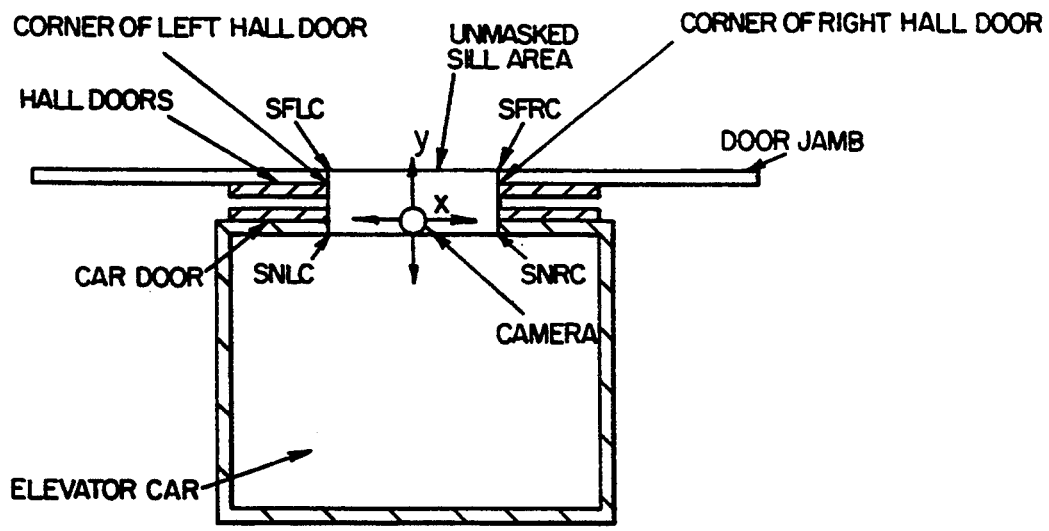
FIG. 3 is a top view of an elevator car showing boundaries of an elevator door sill mask.

FIG. 3 is a top view of an elevator car showing boundaries of the sill mask. The doors are shown fully open. Four points, sill-near-right corner (SNRC), sill-near-left corner (SNLC), sill-far-right corner (SFRC) and sill-far-left corner (SFLC) are shown. The location of these points is used, along with door position provided by the encoder, in a routine (described below in FIG. 11) to generate the sill mask. The unmasked area where moving objects may be detected is shaded. The area covered by the sill mask is not limited to the actual physical sill including the car side and hall side of the sill; it may extend out into the hall. Selection of the area of the sill mask is restricted only by the points SNRC, SFLC, SFRC, and SNLC and the door position. This leads to the opportunity to change the sill mask by changing SNRC, SFLC, SFRC, and SNLC or changing the door position.

Figure 4:
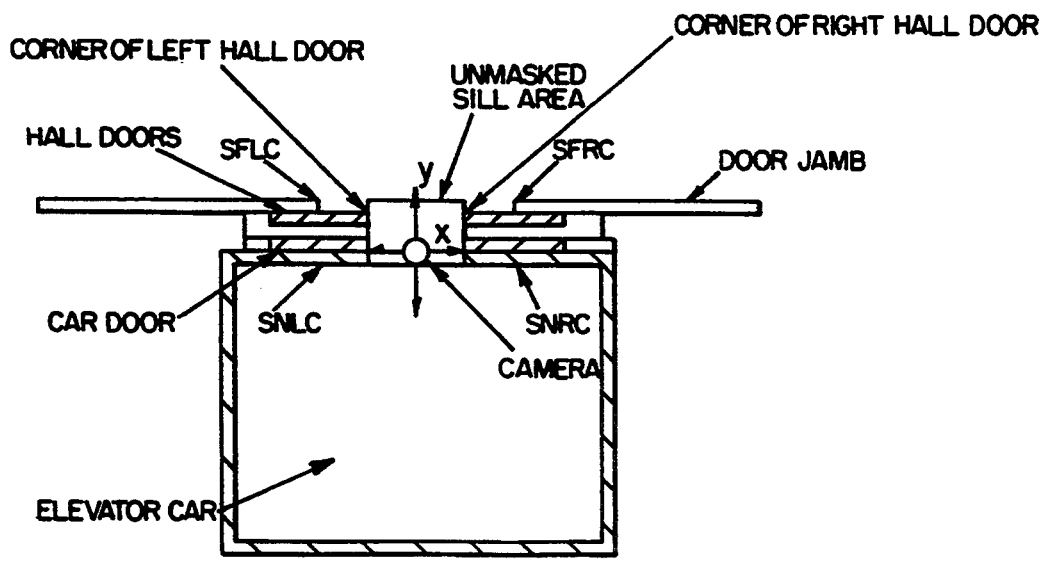
FIG. 4 is a top view of an elevator car showing boundaries of an elevator door sill mask where the boundaries are changed so that the unmasked area is narrowed as compared with the sill mask of FIG. 3 because the elevator doors have moved towards a closed door position.

FIG. 4 is a top view of an elevator car showing boundaries of the sill mask which has narrowed the unmasked area (shaded area) as compared with FIG. 3 because the elevator doors have moved towards a more closed position.

Figure 5:
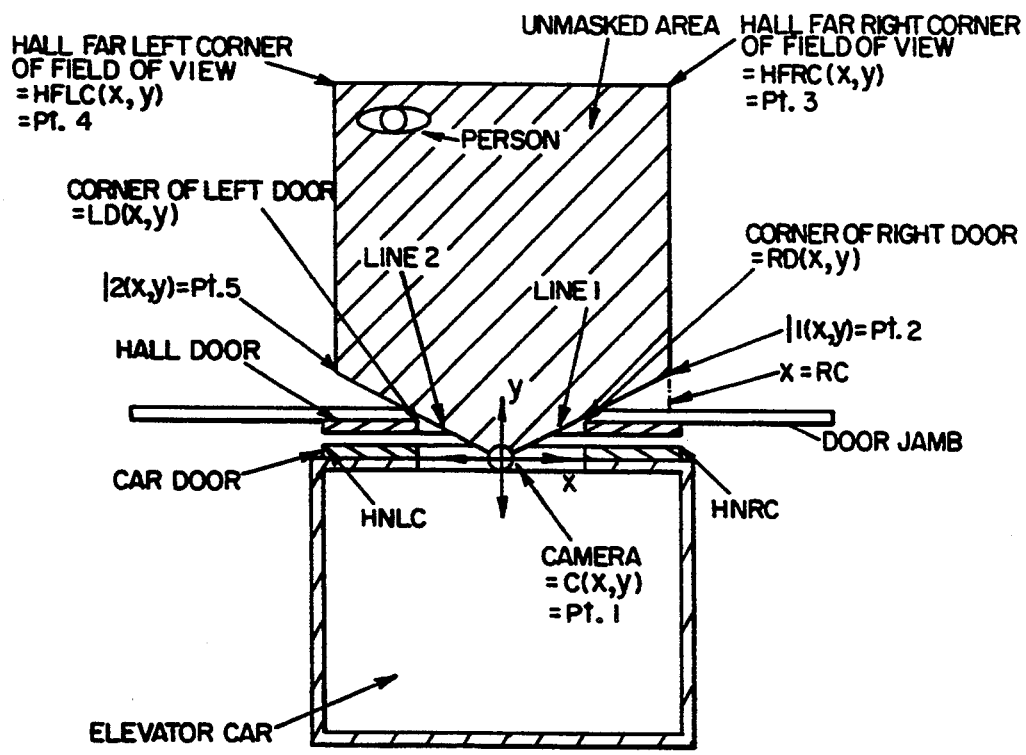
FIG. 5 is a top view of an elevator car showing boundaries of a hall mask. The unmasked area is shaded.

FIG. 5 is a top view of an elevator car showing boundaries of a hall mask.

Figure 6:
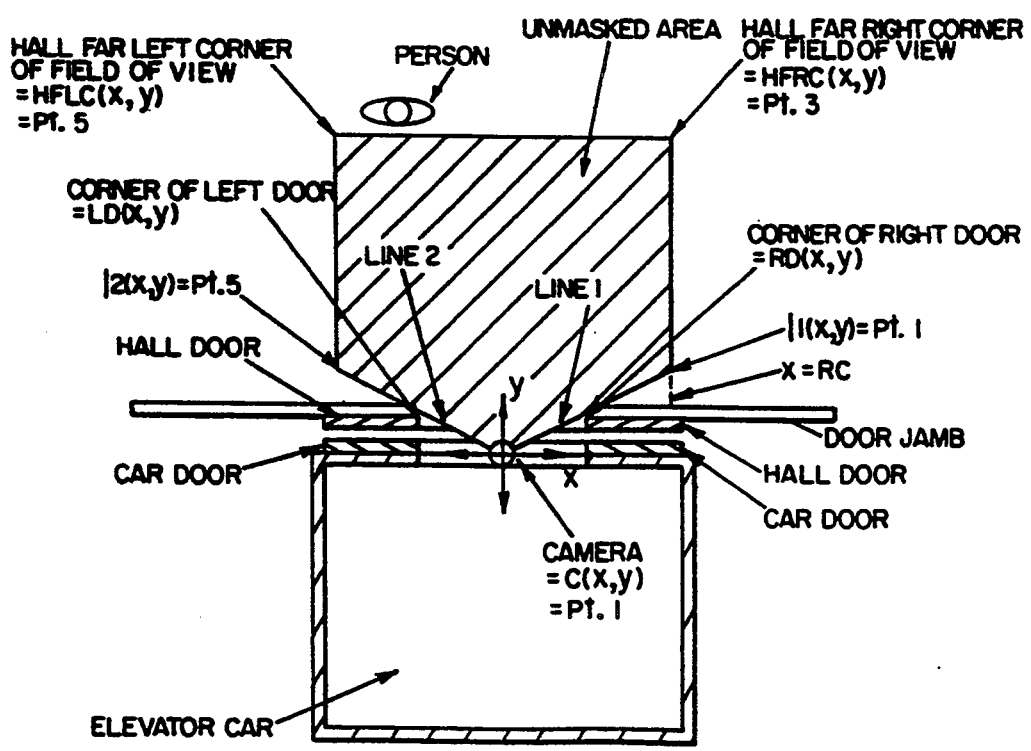
FIG. 6 is an overhead view of an elevator car wherein the hall mask changed so that the unmasked area is decreased in size relative to that illustrated in FIG. 5 to exclude from the video signal a person to cause that person to not be detected.

FIG. 6 is an overhead view of an elevator car wherein the hall mask is increased in size relative to that illustrated in FIG. 5 to exclude from the video signal a person to cause that person to not be detected. In other words, the depth of view of the unmasked area is smaller than in FIG. 5. This illustrates the steps in FIG. 2 demonstrating that if motion is detected, the depth of view is reduced. The purpose of doing this is to distinguish between passengers moving towards the elevator and passengers that are not moving towards the elevator. Alternate to varying the view depth, the view breadth may be altered.

Figure 7:
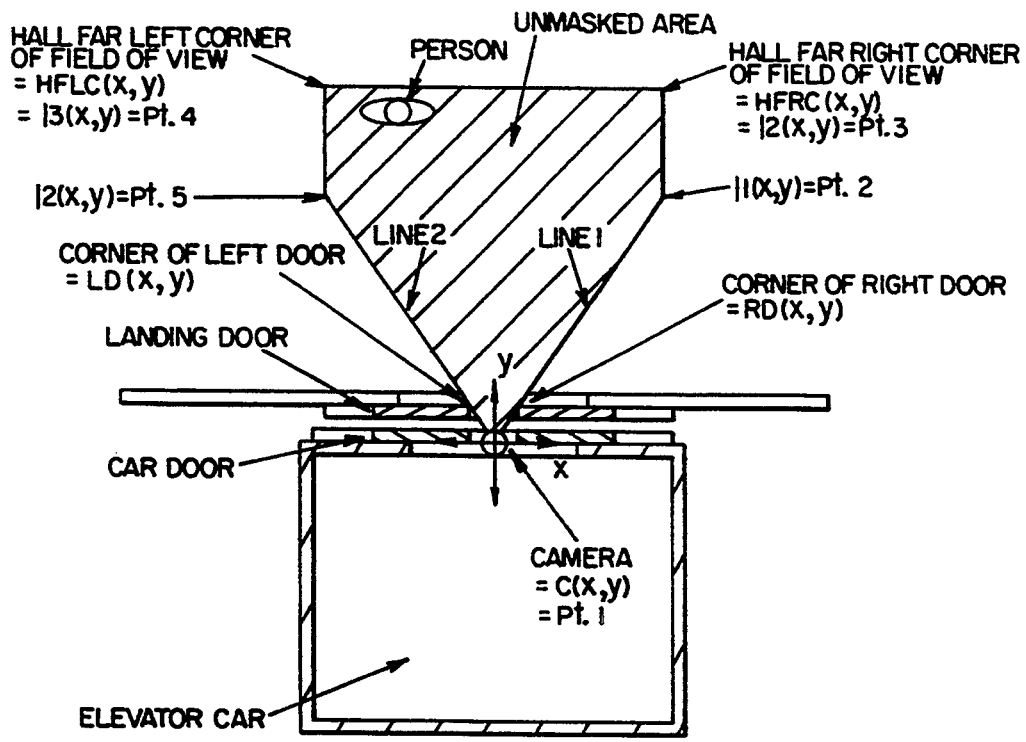
FIG. 7 is an overhead view of an elevator car showing boundaries of a hall mask. The unmasked area is shaded.

FIG. 7 is an overhead view of an elevator car showing boundaries of the hall mask. Here, the doors are in a more closed position than in FIG. 5. The area of the unmasked area is reduced accordingly and the reduction has occurred near the door.

Figure 8:
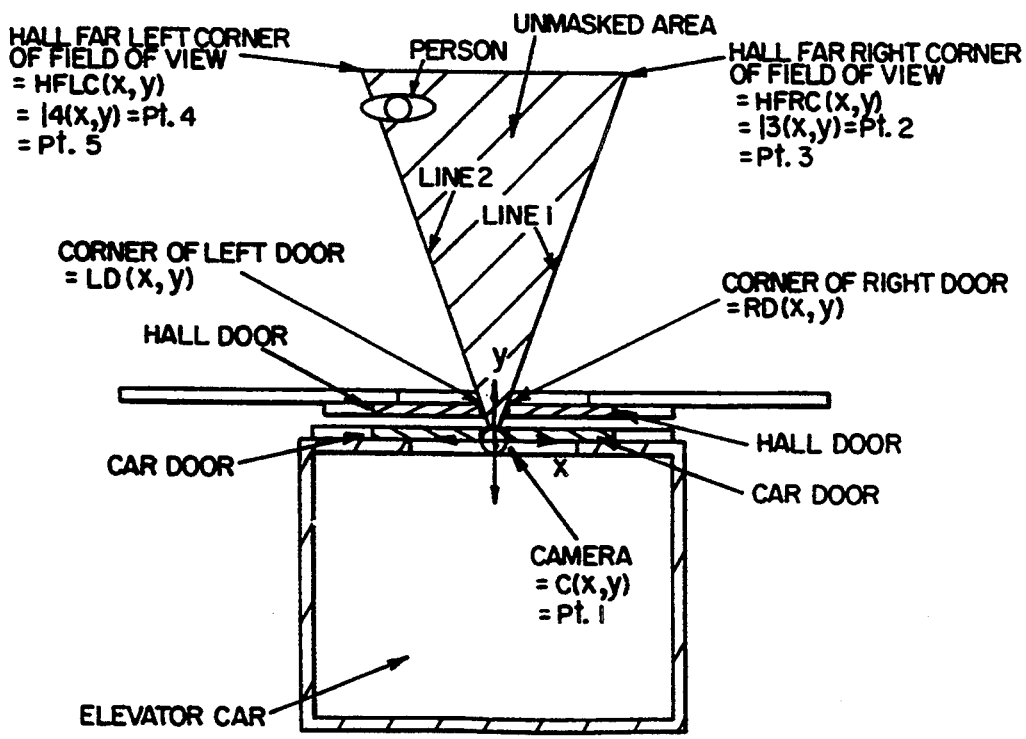
FIG. 8 is an overhead view of an elevator car wherein the hall mask changed so that the unmasked area is decreased relative to the hall mask of FIG. 7 because the position of the elevator doors is different from the position of the elevator doors in FIG. 7.

FIG. 8 is an overhead view of an elevator car wherein the hall mask is increased relative to the hall mask of FIG. 7 and accordingly the unmasked area is still smaller as the doors are nearly fully closed.

The mask boundary parameters for both the sill and hall masks are below. Four feet is an exemplary door sill width.

| PARAMETERS OF MASK BOUNDARIES | |
| --- | --- |
| hall-far-left corner (HFLC) | far left corner of the unmasked area in the hall. For example, (−6,10) |
| hall-far-right | far left corner of the unmasked area |

PARAMETERS OF MASK BOUNDARIES (continued)

| | |
|---|---|
| corner (HFRC) | in the hall. For example, (6,10) |
| hall-near-left corner (HNLC) | near left corner of the unmasked area in the hall. For example, (−6,0) |
| hall-near-right corner (HNRC) | near right corner of the unmasked area in the hall. For example, (6,0) |
| sill-far-left corner (SFLC) | far left corner of the unmasked sill area. For example, (−2,1) |
| sill-far-right corner (SFRC) | far right corner of the unmasked sill area. For example, (2,1) |
| sill-near-left corner (SNLC) | near left corner of the unmasked sill area. For example, (−2,−1) |
| sill-near-right corner (SNRC) | sill near right corner of the unmasked sill area. For example, (2,−1) |
| camera position | (0,0) |
| door position | variable, provided by encoder |

Figure 9:
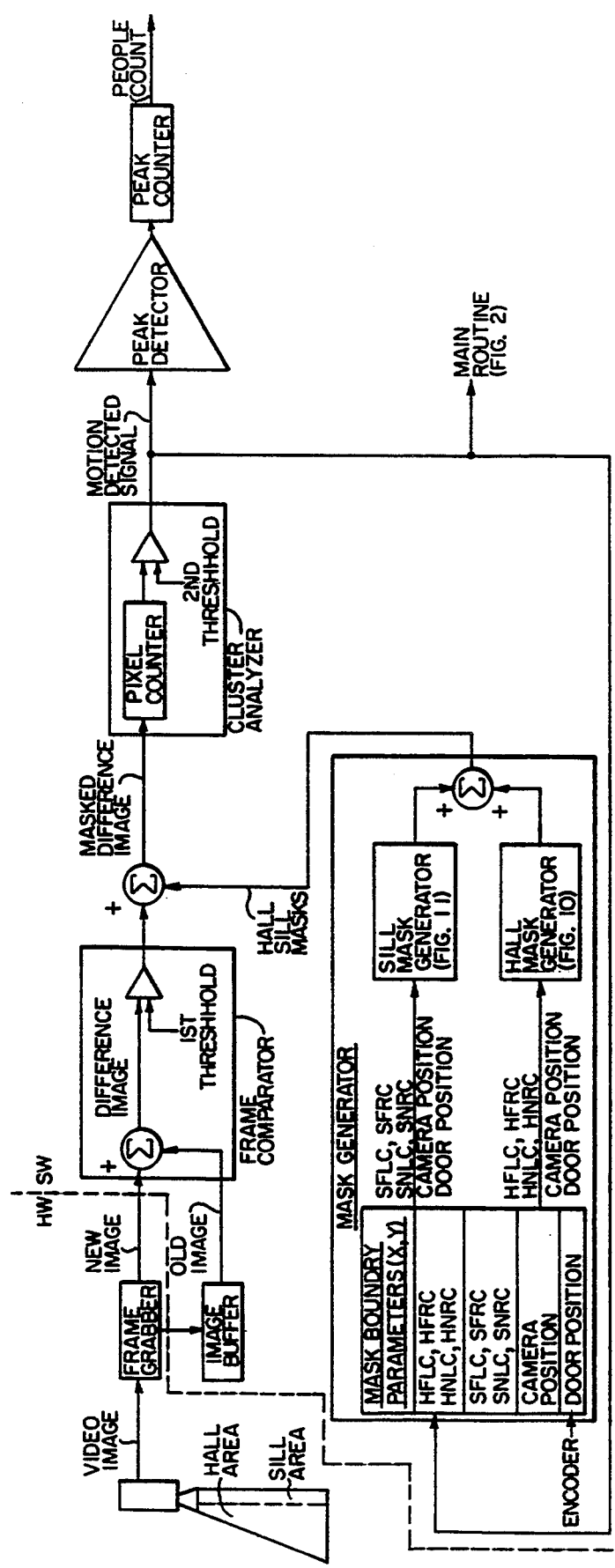
FIG. 9 is a functional block diagram of the hardware and software for implementing the present invention detection called for by the routine of FIG. 2.

FIG. 9 is a block diagram for varying door dwell time in response to detected motion in the sill area and/or the hall and for counting moving objects in the sill area or hall. Those portions of the invention implemented in hardware (HW) are distinguished from those portions of the invention implemented through software (SW) by the dotted line. The camera is, for example, a charge coupled device (CCD) which receives a picture of the hall and sill for providing a video image to a frame grabber located on the Androx image processing board in the image processing people detector of FIG. 1. Each time that a video image is provided to the frame grabber, a new image from the video camera is digitized and stored in the frame grabber.

The frame grabber provides a new frame of the new image from the video camera to a frame comparator and to an image buffer for storage. The image buffer provides an old frame, that is, an image previously provided by the frame grabber, to the frame comparator. The old image provided on initialization of the invention is of a sill and hall clear of people and objects except the elevator and hall system.

The frame comparator compares the new frame with the old frame for providing a difference frame. The comparison of the new frame with the old frame provides an indication of motion in the area seen by the video camera. The value of the difference frame signal indicates motion. The frame comparison is performed within a CPU of the image processing board and is a pixel-to-pixel subtraction and threshold comparison of the new image to the old image. This threshold comparison in the frame comparator is the first of two threshold comparisons in the motion detection process.

Where the video camera provides a black and white video image, the result of frame comparison is a difference image with a given pixel set to either white or black.

Hard limiting through a threshold comparison may be used before or after the difference frame is provided. Where hard limiting is used before the difference image is provided, the function implemented is of EXCLUSIVE ORing of the new image and the old image for providing a difference image having white or black pixels. Alternatively, the new image may be subtracted from the old image and then hard limited through the first threshold comparison for providing a difference image of only white and black pixels. The latter is shown in FIGS. 13-17.

The resulting difference image has the appearance of a silhouette, that is only the moving objects appear in the image; non-moving objects are black pixels.

The difference image is provided to a summer. In response to a door position signal—provided by the door encoder for purposes of locating the door edges—a mask generator provides two masks including a sill mask and a hall mask. From the location of the camera in the elevator car and the location of the left and right corners of the landing door edges, the location of the landing floor visible to the camera is computed in response to door movement.

A hall mask is generated for excluding from consideration motion outside a given part of the viewing area and for cancelling detection of the door movement. Cancelling door movement prevents a false reading of a moving passenger caused when door motion is mistaken for passenger motion. The breadth of the hall mask is adjusted in response to change in location of the door edges. The depth of view of the hall mask area is also changed in response to detection of motion in the unmasked area of the hall. If the elevator doors begin to close, the unmasked area narrows by reducing each of the unmasked areas: the unmasked area in the hall and the unmasked area between the doors over the door sill.

The mask generator stores the mask boundary parameters. The mask boundary parameters are provided to a sill mask generator and a hall mask generator which provide the sill mask and a hall mask to a summer. The sum of the hall and sill masks is then added to the difference image.

The size of the masks may be changed if a motion detected signal is provided to the mask generator. If the doors have not yet fully closed or opened, the mask boundary parameters may be varied. Varying the x coordinates of HFLC or HFRC varies the breadth of the unmasked hall area. Varying the y coordinates of HFLC and HFRC varies the depth of the unmasked hall area. Varying the y coordinates of SFLC, SFRC, SNRC and SNLC varies the height of the unmasked sill area. The width of the unmasked sill area varies with door position.

If no motion is detected, the depth of view is reduced. This reduction is repeated periodically with each run of the main routine of FIG. 2 if no motion is detected in each of successively smaller unmasked areas until the doors are closed.

The difference image and hall and sill masks are logically summed. All pixels that are masked out are made black.

The result of this is that only so much of the silhouettes that appear in the unmasked areas are available.

After masking out a portion of the difference image using the hall mask and the sill mask, a masked difference image indicative of motion in the unmasked area of the hall is provided to a cluster analyzer. There, adjacent lit pixels are combined into clusters. Pixels are lit if they are bright or white rather than dark or black. Small clusters are discarded because they may represent noise rather than true brightness changes indicative of motion in the unmasked area. This cleans up the video image. This is done by adjacent lit pixels being counted and the count compared to a second threshold. If the count in any cluster exceeds the second threshold, motion is assumed to have occurred in the unmasked area. If the lit pixel count in any cluster is less than the second threshold, then no motion is judged to have occurred in the unmasked area of the hall.

A motion detected signal is provided (FIG. 2) if the second threshold is exceeded. The motion detected signal is provided to a depth of view block for indicating that motion was or was not detected as indicated by the threshold count having been exceeded or having not been exceeded. In response, the mask generator varies the magnitude of the view depth. As the amount of time during which no motion is detected increases, the view depth decreases. Motion detection is more fully described below. Alternate to varying the view depth, the view breadth may be altered.

In addition, the motion detected signal is provided to a peak detector for peak detection. The number of peaks detected is equal to the number of moving objects in the unmasked area, that is generally a people count.

FIG. 10 is a flow chart for generation of the hall mask. (Shown in FIGS. 5-8). The software package used is Androx software to be used in conjunction with the Androx image processing board. The inputs are the location of the video camera, the door edge locations as provided by the encoder, and the field of view locations stored in memory on the image processing board and illustrated in the table "Mask Boundary Parameters". Step 1 designates the camera location C(x,y). Step 2 computes the slope S1, from the camera to the corner of the right door edge (RD), given by the encoder, of a line 1. Step 3 computes the intersection I1(x,y) of line 1 with the line X=RC. Steps 4 and 5 are analogous to steps 2 and 3, but for the left side. Steps 6 and 7 together determine whether the unmasked area will be pentagonal (FIGS. 5-7) or triangular (FIG. 8). In Step 6, if the Y component of intersection I1 is less than the Y component of RC(x,y) then the intersection I1 is on the right side of the unmasked area and therefore point 2 of the unmasked area is intersection I1 and point 2 is RC. Then, the unmasked area is pentagonal.

Else, an intersection I3 of the line 1 is computed as identically, both points 2 and 3. Therefore the unmasked area is triangular. Step 7 is analogous to step 6 but for the left side.

FIG. 11 is a flow chart for creation of a sill mask. Inputs to the routine are illustrated in the table. These points are shown in FIGS. 3,4. The mask has four points.

In step 1, point 1 is designated as determined by the x coordinate of RD and the Y coordinate of SNRC. In Step 2, point 2 is designated as RD. Step 3 designates point 3 as LD. Step 4 designates as point 4 the x coordinate of LD and the y coordinate of SNR.

FIG. 12 shows the process of summing the sill and hall masks with the difference image (including a sill difference image and a hall difference image).

FIG. 13 shows a video image for an empty hall. This image is the old one.

Figure 14:
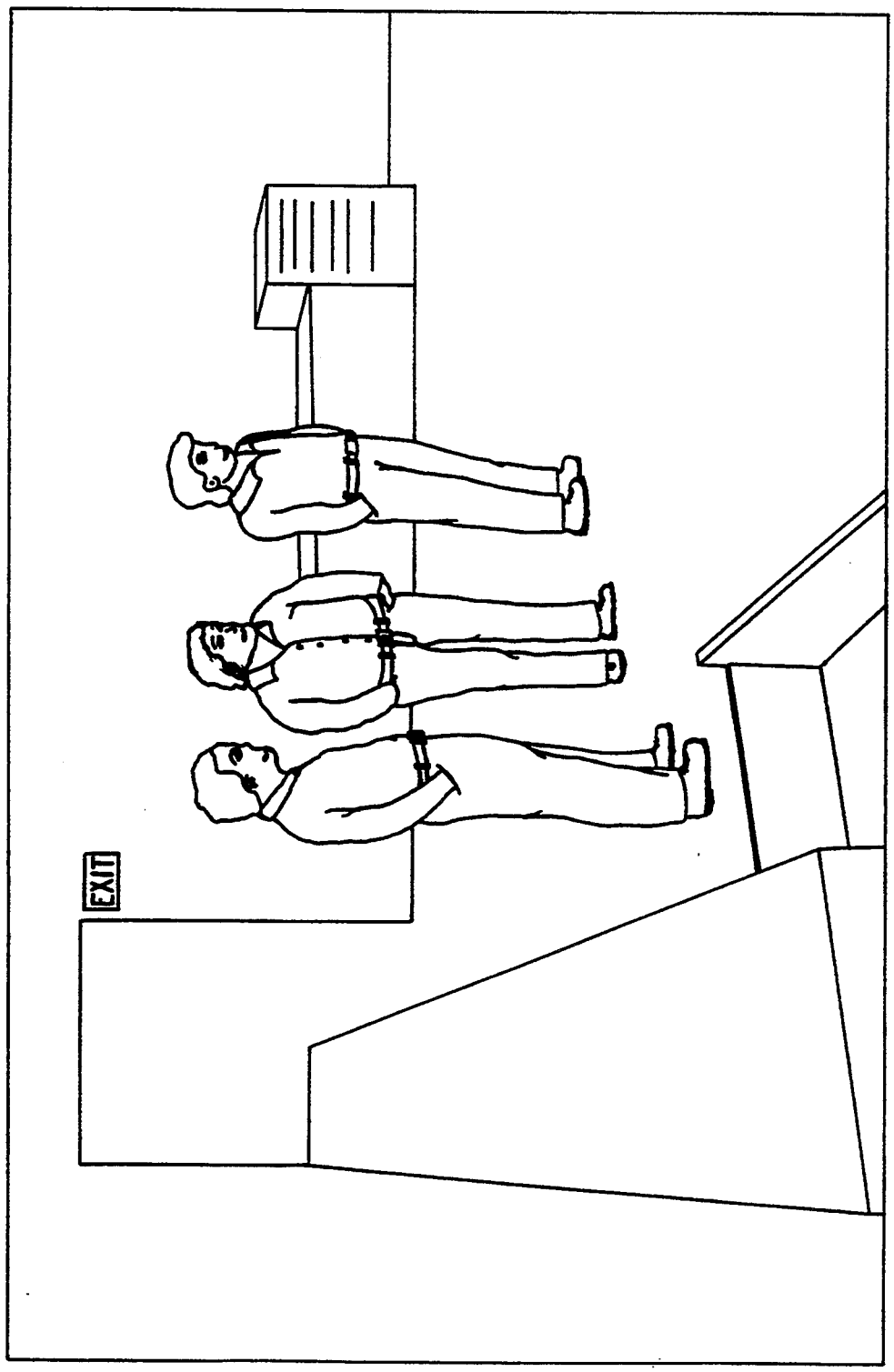
FIG. 14 shows the video image for the hall of FIG. 13 with three people in it.

FIG. 14 shows the video image for the hall of FIG. 13 with three people in it, all standing within the unmasked area. This is the new image.

Figure 15:
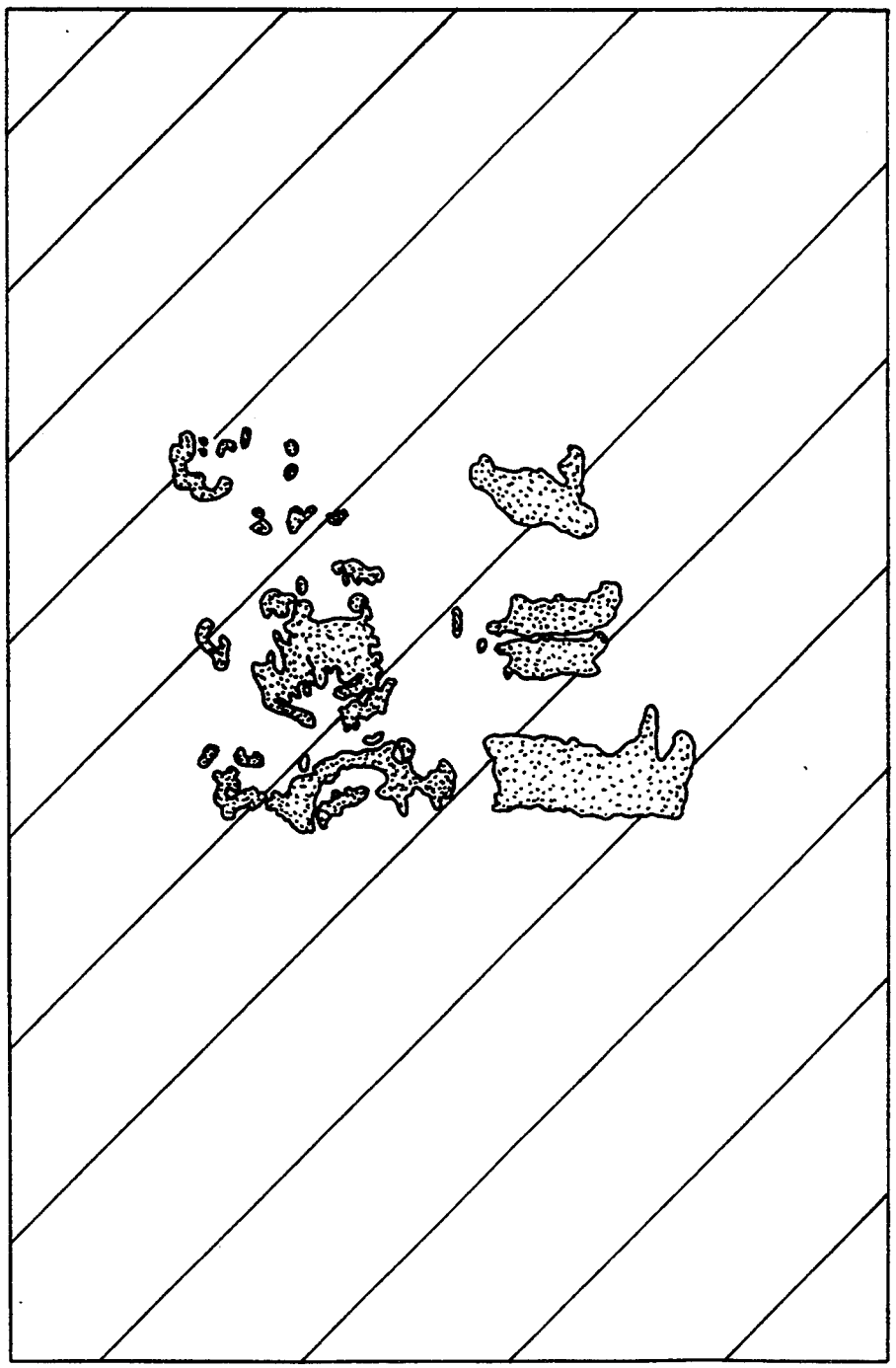
FIG. 15 shows the masked difference image.

FIG. 15 shows the difference frame.

Figure 16:
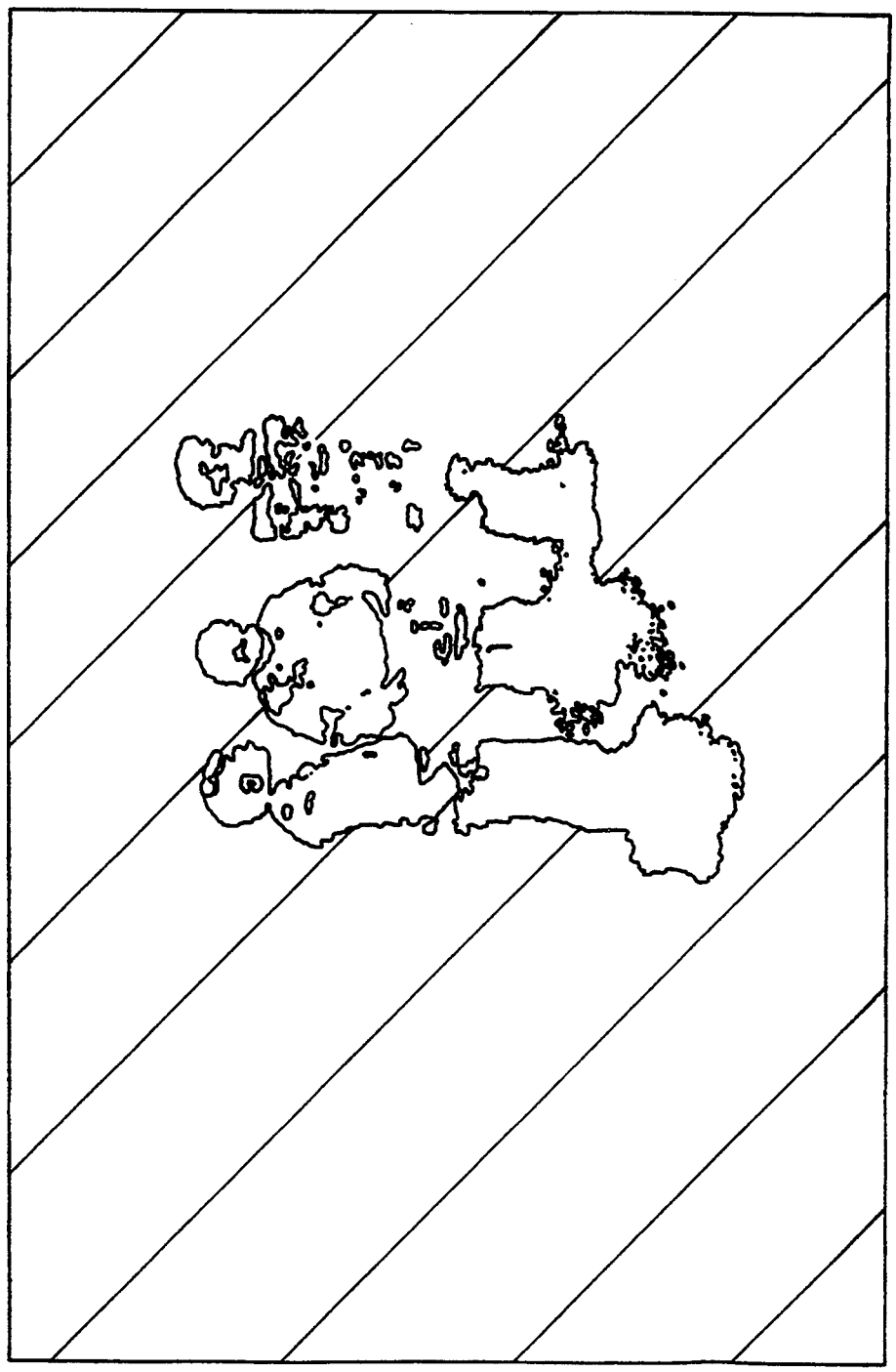
FIG. 16 shows the masked difference image after threshold comparison.

FIG. 16 shows the difference frame after the first threshold comparison in the frame comparator.

Figure 17:
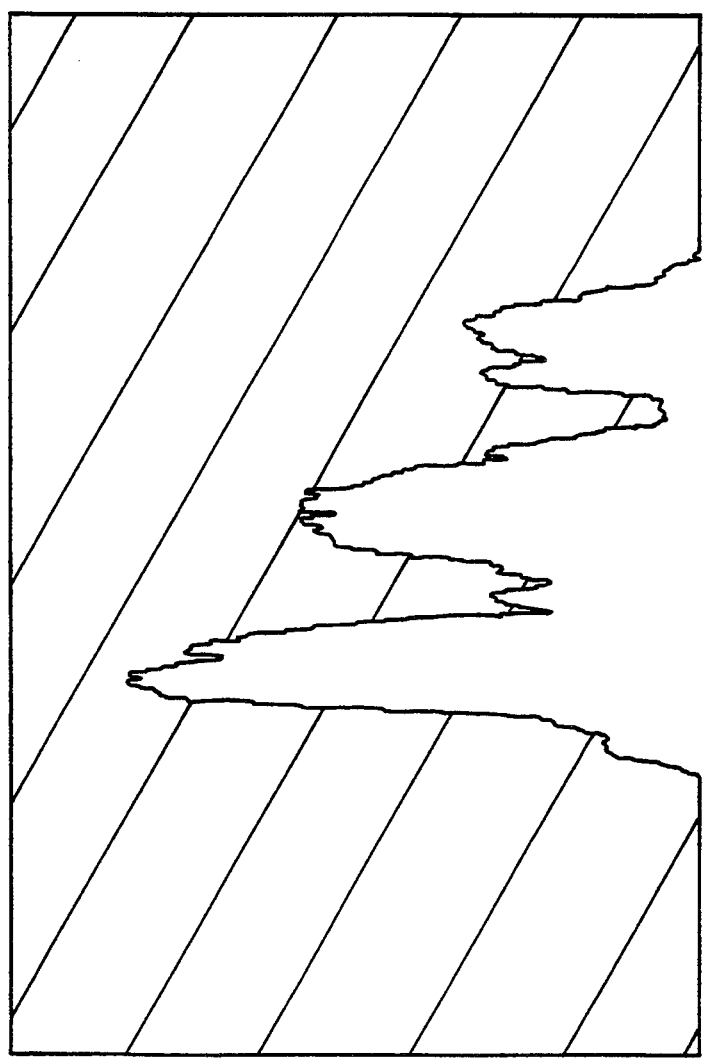
FIG. 17 shows the masked difference image and the number of peaks representative of the number of moving objects in the unmasked viewing area.

FIG. 17 shows the number of peaks representative of the moving number of objects in the unmasked viewing area is three. The number of peaks is generally a people count.

Various changes may be made herein without departing from the invention. Alternate to the image processing board from Androx and separate camera is the "Imputer" available from VLSI VISION LTD of Edinburgh, Scotland which includes a camera and image processing board in the same package. In addition, alternative to the use of a video signal from a video camera is the use of an infrared signal or ultraviolet signal; masking of either type signal is included in the present invention.

We claim:

1. A method for detecting motion in the vicinity of an open elevator hall door, comprising:
   a. providing an image of an elevator door sill and a hall in front of an elevator including
   providing an old image of the elevator door sill and hall
   providing a new image of the elevator door sill and hall
   subtracting the old image from the new image for providing a difference image;
   b. providing a motion detected signal in response to said difference image;
   c. over a time period masking out a portion of said difference image, so long as no motion detected signal is provided, thereby providing a masked difference image; and then
   d. providing a motion detected signal in response to said masked difference image if a number of pixels in the masked difference image exceeds a selectable threshold
   e. commanding the elevator door to close when said motion detected signal is no longer provided.

2. The method of claim 1,
   wherein said difference image comprises a plurality of pixels of variable brightness; and
   further including the step of
   counting clusters of adjacent pixels exceeding a selectable brightness whose number exceeds said selectable threshold, in response to said motion detected signal provided in response to said masked difference image, thereby providing a count of the number of moving objects in the area of the hall and sill the image of which is not masked out.

3. A method for controlling an elevator door, comprising:
   a. providing an image of an elevator door sill and a hall in front of an elevator;
   b. providing a motion detected signal in response to said image;
   c. over a time period masking out increasingly greater portions of said image so long as said motion detected signal is provided;
   d. commanding the elevator door to close when said motion detected signal is no longer provided.

4. The method of claim 3, wherein a. and b. include
   providing an old image of the elevator door sill and hall;
   providing a new image of the elevator door sill and hall;
   subtracting the old image from the new image for providing a difference image including a plurality of pixels of variable brightness and providing said motion detected signal in response to said difference image.

5. The method of claims 4 further including
   counting the number of pixels of the difference image;
   comparing the number of pixels of the difference image with a second threshold;
   providing said motion detected signal if said second threshold is exceeded.

6. The method of claims 4 further including comparing the number of pixels of the difference image with a second threshold;
providing said motion detected signal if said second threshold is exceeded.

7. The method of claim 4 wherein the step of masking out portions of said image includes the steps of
providing an hall mask for cancelling a portion of that part of the image associated with the hall;
providing a sill mask for cancelling a portion of that part of the image associated with the door sill;
summing said hall and sill masks with said image.

8. The method of claim 4 wherein said step of masking out increasingly greater portions of said image includes the steps of
providing a hall mask for cancelling a portion of that part of the image associated with the hall;
increasing the breadth or increasing the depth of the hall mask
summing said hall mask with said image.

9. The method of claim 4 further including the step of commanding the door to close; and
masking out increasingly greater portions of said image until the door is closed or until motion is detected, in which case the door is commanded to open.

10. An apparatus for elevator door control, comprising:
a camera for providing an image of an elevator door sill and a hall in front of an elevator;
an image buffer for storing an old image;
a summer for adding said old image and a new image and providing a difference image including a plurality of pixels of variable brightness and providing said motion detected signal in response to said difference image;
a mask generator for masking out, increasingly with time, measured from the most recent of motion being detected or the door opening, greater portions of said difference image so long as said motion detected signal is provided;
means for commanding said door to close when said motion detected signal is no longer provided.

11. The apparatus of claim 10 further including
a comparator for comparing the brightness of said plurality of pixels and providing in their respective places pixels of one or the other of two states, lit or not lit, depending on whether a first threshold is exceeded.

12. The apparatus of claim 10
wherein said mask generator provides a masked difference frame and further including
a cluster analyzer for providing said motion detected signal if the number of adjacent pixels in the lit state exceeds a second threshold.

13. The apparatus of claim 10 further including
means for commanding the door to close; and
wherein said mask generator masks out, increasingly with time, greater portions of said image until the door is closed or until motion is detected, in which case the door is commanded to open.

* * * * *